United States Patent [19]

Baerns et al.

[11] 3,923,867

[45] Dec. 2, 1975

[54] METHOD FOR PRODUCING MONOMETHYL TEREPHTHALATE

[75] Inventors: Manfred Baerns; Bruno Beck; Karl Ludwig Schmid; Hubert Machacek; Günther Beige; Heinz Nogge, all of Essen, Germany

[73] Assignee: Dynamit Nobel Aktiengesellschaft, Troisdorf, Germany

[22] Filed: June 5, 1972

[21] Appl. No.: 259,979

[52] U.S. Cl............................................. 260/475 R
[51] Int. Cl.[2]......................................... C07C 69/82
[58] Field of Search........................ 260/475, 475 B

[56] References Cited
UNITED STATES PATENTS

| | | | |
|---|---|---|---|
| 2,653,165 | 9/1953 | Levine................................ | 260/475 |
| 2,813,119 | 11/1957 | Taves................................. | 260/475 |
| 2,834,801 | 5/1958 | Aldridge et al................... | 260/485 S |
| 3,076,019 | 1/1963 | Baldwin............................ | 260/475 B |

FOREIGN PATENTS OR APPLICATIONS

| | | | |
|---|---|---|---|
| 862,391 | 3/1961 | United Kingdom................ | 260/475 |

*Primary Examiner*—Robert Gerstl
*Assistant Examiner*—E. Jane Skelly
*Attorney, Agent, or Firm*—Spencer & Kaye

[57] ABSTRACT

A method for producing monomethyl terephthalate, including dissolving in p-xylene a polyvalent heavy metal salt catalyst for the oxidation of p-xylene to p-toluic acid, oxidizing the resulting p-xylene at a temperature between 90° and 140°C, a pressure between 1 and 15 atmospheres, and an oxygen partial-pressure of less than 3 atmospheres to p-toluic acid, stopping the oxidation of the p-xylene at the point of maximum achievable selectivity for p-toluic acid, esterifying the resulting p-toluic acid to the methyl ester of p-toluic acid, dissolving in the resulting methyl ester of p-toluic acid a polyvalent heavy metal salt catalyst for the oxidation of the methyl ester of p-toluic acid to monomethyl terephthalate, oxidizing the resulting methyl ester of p-toluic acid at temperatures between 130° and 200°C and pressures between 1 and 6 atmospheres to monomethyl terephthalate, stopping the oxidation of the methyl ester of p-toluic acid at the point of maximum achievable selectivity for monomethyl terephthalate, and purifying the resulting monomethyl terephthalate.

4 Claims, 1 Drawing Figure

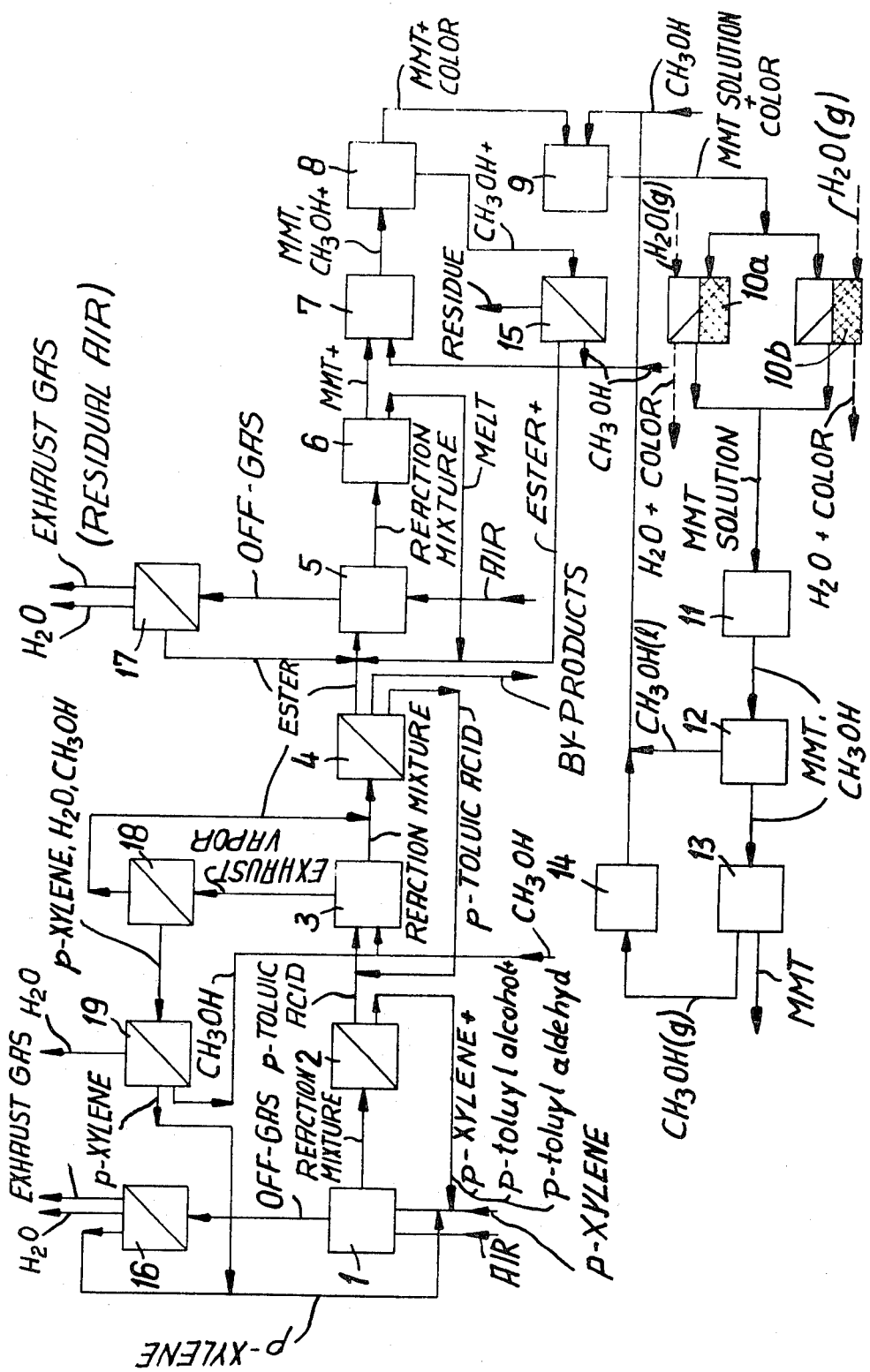

METHOD FOR PRODUCING MONOMETHYL TEREPHTHALATE

BACKGROUND OF THE INVENTION

The present invention relates to a method for producing monomethyl terephthalate from p-xylene.

A suitable method for the industrial production of pure monomethyl terephthalate has not been in existence. It is known that monomethyl terephthalate arises as an intermediate product when producing oxidation products of p-xylene. See, for instance, page 679 of ORGANIC CHEMISTRY by Morrison and Boyd, Allyn and Bacon, Boston (1959). But, there is no process that is directed solely toward the winning of pure monomethyl terephthalate in large quantity as compared with the amount of p-xylene charged to the process. There is no data in existence on whether and under what reaction conditions the conversion of p-xylene into monomethyl terephthalate is possible while largely excluding by-products.

Also, monomethyl terephthalate has as yet not been used as a starting material for polyester production, namely for making polyester monomers.

On an industrial scale, polyester production is presently done using, for example, dimethyl terephthalate or terephthalic acid. The terephthalic acid is esterified with a bifunctional alcohol, for example ethylene glycol. The dimethyl terephthalate is transesterified using such an alcohol. Both the dimethyl terephthalate and the terephthalic acid must be in extremely pure form.

The production of terephthalic acid in the extremely high purity necessary for polyester production gives, however, great technical difficulties. Especially is this true with reference to colored impurities. Dimethyl terephthalate, which can be more easily won in pure form than can terephthalic acid, has, however, the disadvantage as a polyester forming compound that, in order, to form a polyester monomer, two methanol-based ester groups must be transesterified with a polyfunctional alcohol; this produces a considerable amount of methanol as an undesired by-product. Furthermore, ballast components in the starting materials are disadvantageous for the case where the starting materials must be transported to some other area before polymerization is undertaken, since here the ballast components add to the transport costs. The situation is particularly disadvantageous when the ballast material leads to valuable by-products, such as is the case in the transesterification of dimethyl terephthalate where methyl alcohol is obtained, since then one has to take measures for utilizing the by-product during the polyester monomer formation or for transporting the by-product away for further working.

SUMMARY OF THE INVENTION

An object of the present invention, therefore, is to provide a method for winning pure monomethyl terephthalate economically in industrial quantities with the greatest possible yield per unit of p-xylene starting material.

In particular, it is an object of the present invention to provide monomethyl terephthalate as a starting material for the winning of polyester. In this connection, it is an object of the invention to obtain with monomethyl terephthalate such a storable and transportable polyester starting product that the smallest possible quantities of by-product occur during polyester monomer formation and that the by-product, is along with methanol, water.

These as well as other objects which will become apparent in the discussion that follows are achieved, according to the present invention, by a method for producing monomethyl terephthalate, including the steps of dissolving in p-xylene a polyvalent heavy metal salt means for catalyzing the oxidation of p-xylene to p-toluic acid, oxidizing the resulting p-xylene with air or another gas containing oxygen at a temperature between 90° and 140°C, a pressure between 1 and 15 atmospheres, and an oxygen partial-pressure of less than 3 atmospheres to p-toluic acid, stopping the oxidation of the p-xylene at the point of maximum achievable selectivity for p-toluic acid, esterifying the resulting p-toluic acid to the methyl ester of p-toluic acid, dissolving in the resulting methyl ester of p-toluic acid a polyvalent heavy metal salt as a means for catalyzing the oxidation of the methyl ester of p-toluic acid to monomethyl terephthalate, oxidizing the resulting methyl ester of p-toluic acid with air or another gas containing oxygen at temperatures between 130° and 200°C and pressures between 1 and 6 atmospheres to monomethyl terephthalate, stopping the oxidation of the methyl ester of p-toluic acid at the point of maximum achievable selectivity for monomethyl terephthalate, and purifying the resulting monomethyl terephthalate.

GENERAL ASPECTS OF THE INVENTION

The oxidation of p-xylene with air or a nitrogen/oxygen mixtute to p-toluic acid is known per se as an intermediate step in the winning of terephthalic acid or its alkyl esters. The oxidation is there mostly carried out in the presence of catalytic polyvalent heavy metal salt solute in bubble-column reactors at increased pressure and temperature. The reaction is known to move through different intermediate products, of which p-tolualdehyde and p-toluyl alcohol are isolateable as stable intermediates, to p-toluic acid. In a subsequent reaction, p-toluic acid and p-toluyl alcohol form the p-toluic acid p-toluyl ester. Moreover, usually not inconsiderable quantities of terephthalaldehyde acid and terephthalic acid form by oxidation of the remaining free methyl group of the p-toluic acid. Frequently, there are also polynuclear aromatic oxidation products occurring too.

These known oxidation reactions do not, however, lead to solution of the objects of the present invention where pure monomethyl terephthalate is to be produced with the greatest possible yield and purity starting from p-xylene. Thus, for this purpose, it is necessary that the oxidation of p-xylene lead predominantly to p-toluic acid. According to the experience gained from the previously practiced oxidation reactions, it has not appeared possible to force the reaction in such a direction. Thus, it has been the opinion that it is not possible in the oxidation of p-xylene largely to suppress the formation of p-toluic acid p-toluyl ester, terephthalaldehyde acid and terephthalic acid together with polynuclear aromatic oxidation products as succeeding products of the p-toluic acid.

However, the reaction conditions as provided by the present invention do surprisingly lead to just that, unexpected result. Now that the present invention has been made, it is thought that the explanation for this is that the particular reaction conditions of the present invention cause the intermediate p-toluyl alcohol to react further, contrary to earlier assumptions, to p-toluic acid. It was, furthermore, not predictable under the state of the art at the time the invention was made that the reaction conditions according to the present invention would largely suppress the reaction between p-toluyl alcohol and p-toluic acid to the undesired succeeding product of p-toluic acid p-toluyl ester.

Oxidation of p-xylene to p-toluic acid can be carried out under the reaction conditions according to the invention either discontinuously or continuously. In both cases, the reaction must be carried out within the given process parameter ranges in such a way that the intermediate products react as far as possible to p-toluic acid and that the formation of products beyond p-toluic acid is still small. This condition is achieved by stopping the oxidation process at the point of maximum achievable selectivity, i.e., the point where the mols of p-toluic acid formed per mol p-xylene minus the mols of intermediates i.e., p-toluyl alcohol and p-toluylaldehyde which are also oxidisable to p-toluic acid in a subsequent operation are a maximum. Thus, oxidation is only carried out to an incomplete p-xylene conversion. This point corresponds to the minimum of the sum of the selectivities of the undesired by-products.

The p-toluic acid is separated by a suitable thermal or mechanical separation process from the remaining components in the reaction mixture. Unconverted p-xylene as well as the intermediates p-toluylaldehyde and p-toluyl alcohol, which can be oxidized further to p-toluic acid, are then according to the invention charged in a subsequent batch for oxidation or recycled to the reactor if the oxidation is carried out continuously.

In carrying out the oxidation of the p-toluic acid methyl ester to monomethyl terephthalate, the same goals are present as in the oxidation of p-xylene to p-toluic acid. Also here, the job to be done is to carry out the oxidation reaction under such conditions that monomethyl terephthalate is won in largest possible and constant yield. It is especially to be heeded that the formation of by-products is suppressed as far as possible.

The previous knowledge in the art, according to which it was appreciated that when p-toluic acid methyl ester is oxidized using a soluble, polyvalent, heavy metal salt catalyst monomethyl terephthalate is produced, in no way indicated how the objects of the present invention were to be attained. In the previous oxidation processes, pressure and temperature lay in such a range that a considerable amount of the monomethyl terephthalate was converted to dimethyl terephthalate and terephthalic acid. Likewise associated with these processes were as a rule large amounts of by-products undesired for the process according to the present invention — products such as p-toluic acid, which is extremely damaging for the monomethyl terephthalate end product, especially in so far as it is to serve immediately for forming polyester monomer. Furthermore, the previous oxidation reactions have resulted in contaminant compounds which even in trace amounts color the reaction product; it is assumed that these contaminant compounds have benzil and/or fluorenone structures. The colored contaminants, which are especially damaging from the processing of the monomethyl terephthalate to polyester, cannot be removed to a sufficient degree by usual purification methods, such as scrubbing and/or recrystallization. Even sublimation or distillation cannot be considered for the purpose of purification, since the requisite temperatures produce a considerable thermal conversion of the monomethyl terephthalate to dimethyl terephthalate and terephthalic acid. This is shown in Table 1, where the following abbreviations are used: MMT = monomethyl terephthalate; DMT = dimethyl terephthalate; TPA = terephthalic acid.

Table 1

Thermal conversion of monomethyl terephthalate (starting substance was monomethyl terephthalate).

| T | time | MMT | DMT | TPA |
|---|------|-----|-----|-----|
| °C | hrs. | Mol-% | | |
| 180 | 5 | 92.6 | 3.7 | 3.7 |
| 200 | 5 | 91.1 | 4.4 | 4.4 |
| 225 | 2 | 90.4 | 4.8 | 4.8 |
| 225 | 8 | 72.3 | 13.8 | 13.8 |
| 240 | 1 | 93.8 | 3.1 | 3.1 |
| 240 | 2 | 87.0 | 6.5 | 6.5 |
| 240 | 4 | 80.6 | 9.7 | 9.7 |
| 240 | 8 | 70.1 | 14.9 | 14.9 |

In contrast to the known oxidation processes, the method according to the present invention using the above-given reaction parameter ranges allows the winning of pure monomethyl terephthalate in high yield. Thus, the oxidation of the charged methyl ester of p-toluic acid to monomethyl terephthalate according to the present invention is so efficient that, of the charged ester, at least 90 percent of it ends up as monomethyl terephthalate.

As in the case of the oxidation of the p-xylene, the oxidation of the methyl ester of toluic acid according to the invention must also be stopped at the point of maximum achievable selectivity, as determined by the maximum of the ratio mols of resulting monomethyl terephthalate per mol of reacted p-toluic acid methyl ester minus the mols of methyl ester of terephthalaldehyde acid which is oxidisable to monomethyl terephthalate in a subsequent operation.

In carrying out the oxidation of the methyl ester of p-toluic acid under the reaction parameter conditions of the invention, there results that the essential intermediate product, the methyl ester of terephthalaldehyde acid, is almost completely reacted to monomethyl terephthalate. Furthermore, the formation of 1. products beyond monomethyl terephthalate, thus succeeding products such as dimethyl terephthalate and terephthalic acid, which result from the above-mentioned thermal conversion of monomethyl terephthalate (see Table 1), 2. p-toluic acid, which arises as a decomposition product, and 3. high boiling point or sublimating polynuclear aromatic compounds is suppressed to such an extent that only extremely small amounts of these products arise.

The esterification of the present invention, where the p-toluic acid obtained through the oxidation of p-xylene is esterified with methanol to the methyl ester of p-toluic acid, may be according to conventional technology.

Thus, for example, it is known to carry out the esterification of p-toluic acid in liquid phase below the critical temperature of the methanol, this lying at 240°C, in pressure vessels. In such operation, however, no complete conversion of the p-toluic acid is achieved, because the chemical equilibrium in the region of practically realizable reaction conditions does not lie completely on the p-toluic acid methyl ester side. In another known manner of operation, the esterification is carried out above the critical temperature of the methanol or at such pressure and temperature combinations that the methanol is always in vaporous form. This vaporous methanol is bubbled through the solid or molten p-toluic acid, or through its solution or suspension in previously formed ester in which methanol is partially solved. This last method has the advantage that the forming water of reaction is driven off with the vaporous methanol and this means that the chemical equilibrium can be shifted completely in favour of the desired ester.

In principle, it is possible in the production of monomethyl terephthalate according to the invention to carry out the esterification of the p-toluic acid to p-toluic acid methyl ester particularly by the second of the two mentioned known methods. The molten p-toluic acid streams in a pressure column downwards in countercurrent flow to the vaporous methanol, and the formed ester is removed below.

Concerning the purification step of the invention, the monomethyl terephthalate won by the oxidation of p-toluic acid methyl ester must finally be cleaned. The purification can, for example, proceed in known manner by washing using solvents. There is also the possibility of treating the monomethyl terephthalate like the dimethyl terephthalate won from p-xylene over intermediate stages and used for making polyester; here there is a multiple recrystallization and final rectification. All these known measures do not lead, however, to an entirely satisfactory result, especially with regard to suitability of the monomethyl terephthalate, as far as purity is concerned, for further working to polyester.

The monomethyl terephthalate won according to the present invention is especially suited as a starting material in the production of appropriate monomers for polyester formation.

Compared with, for example, terephthalic acid, which has previously been used as a starting material for polyester monomer formation, monomethyl terephthalate has the great advantage that it can be produced according to the method of the present invention in industrial quantities economically in the purity required for polyester formation and in good yield. As compared with another known starting material for polyester formation, namely dimethyl terephthalate, monomethyl terephthalate distinguishes itself by having only one methanol-based ester group to be converted using a polyfunctional alcohol; among other advantages, the weight of starting material (monomethyl terephthalate) required for transesterification or esterification to polyester monomers, based on a given amount of polyester monomers to be produced, is smaller than in the case of dimethyl terephthalate.

The pure monomethyl terephthalate won according to the present invention can be used as a starting product or intermediate product for the production of pure dimethyl terephthalate. It is esterified, using methanol, to dimethyl terephthalate.

Also the pure monomethyl terephthalate producible according to the present invention can be easily reacted to terephthalic acid by hydrolysis.

BRIEF DESCRIPTION OF THE DRAWING

The sole FIGURE of the drawing is a schematic flow diagram of the method of the invention.

DESCRIPTION OF THE PREFERRED EMBODIMENTS

Preferably, the oxidation of the p-xylene is carried out at temperatures between 90° and 130°C, pressures between 3 and 15 atmospheres, with a cobalt salt as oxidation catalyst in a concentration between $10^{-5}$ and $10^{-2}$ gram-atoms cobalt per mol of p-xylene, and with a p-xylene conversion up to a value between 15 and 60 percent. Preferably, the oxidation of the p-toluic acid methyl ester is carried out at temperatures between 140° and 170°C, pressures between 1 and 3 atmospheres, with a cobalt salt as oxidation catalyst in a concentration between $10^{-5}$ and $10^{-3}$ gram-atoms cobalt per mol p-toluic acid methyl ester, and with a conversion of p-toluic acid methyl ester up to a value between 20 and 45 percent. Relative to improving p-toluic acid yield, it is preferred to operate to a p-xylene conversion between 20 and 50 percent.

These narrower ranges of reaction conditions for the oxidation of p-xylene to p-toluic acid are based on the consideration that in the pressure and temperature ranges of the invention the formation of p-toluic acid p-toluyl ester is lessened by rising pressure and falling temperature, because the solubility of the resulting reaction water increases in the reaction mixture and consequently the position fo the chemical equilibrium is shifted in favor of p-toluic acid and p-toluyl alcohol. At lower temperatures, oxidation of p-toluic acid further to, for example, the previously mentioned terephthalaldehyde, terephthalaldehyde acid and terephthalic acid occurs to a lesser degree; their formation increases, however, with rising oxygen partial pressure.

Concerning the concentration of the catalyst, which can also be manganese for example, in the xylene oxidation, lower concentrations lead, for constant reaction conditions, to lesser formation of the undesired succeeding products terephthalic acid and terephthalaldehyde acid. Thus, it is preferred to use a cobalt concentration between $10^{-5}$ and $5 \times 10^{-4}$ gram-atoms cobalt per mol p-xylene.

It is furthermore preferred in the present invention to carry out the oxidation processes continuously in gas/-liquid reaction systems, preferably in bubble-column reactors, which are provided with internals or which are divided in cascade manner, for the purpose of providing a uniform retention time for all volume elements of the liquid.

In order, for continuous operation of the invention, to hold the amount of intermediate and succeeding products leaving the reactor as small as possible, it is necessary to realize a narrow retention time spectrum in the reactor. That is, choosing any arbitrary volume element of liquid passing through the reactor, the time it takes to pass through must preferably be equal to the time taken by any other arbitrarily chosen volume element. This goal can be achieved by a cascade arrangement of a plurality of ideally mixing, continuous flow-through reaction vessels. In the oxidation of the p-xylene, there is charged both fresh p-xylene and p-xylene, p-toluyl alcohol, and p-tolualdehyde separated and recycled from reaction mixture which has previously gone through the reactor. A narrow retention time spectrum can, according to the invention, be obtained by a multistage, bubble-column reactor, in which the mixing of the liquid reactor contents along the reactor axis, i.e. in the flow direction, is suppressed as far as possible. Alternatively, it can be obtained in several one-stage bubble-column reactors, which have been arranged in series, so that the liquid reaction mixtures flows through the individual reactors one after the other without there being a mixing of reaction mixture back into previous reactors from subsequent reactors. It is advantageous to run gas and liquid countercurrent in the reaction systems.

Relative to the esterification step of the method of the invention, it is preferred that it be continuous. The p-toluic acid is esterified with methanol to the methyl ester of p-toluic acid in two steps: After being dissolved in liquid methanol, the p-toluic acid is esterified in an autoclave or in a cascade of autoclaves, at first incompletely; the resulting reaction mixture is then fed into a pressure reactor or a pressure column and run countercurrent to gaseous methanol for converting the remainder of the p-toluic acid into the methyl ester of p-toluic acid. Both steps in the esterification are carried out continuously.

Advantageously, unreacted methanol is removed from the reaction mixture before the reaction mixture is fed into the second step in the pressure reactor or pressure column.

In a further refinement of the esterification, the incomplete esterification step is carried out in a cascade of stirring autoclaves at temperatures between 150° and 230°C and preferably between 200° and 230°C, pressures between 15 and 60 atmospheres and preferably between 40 and 60 atmospheres; and the completion esterification is carried out in a pressure column at temperatures between 200° and 260°C and pressures assuring that the methanol is present predominantly in vaporous form at the chosen temperature.

The maximum achievable yield of p-toluic acid methyl ester is given by the following experimentally determined temperature dependence of the chemical equilibrium constant $K$:

$$\log K = - \frac{1585}{T °K} + 3.67,$$

where $K = \frac{(\text{p-toluic acid methyl ester}) \times (\text{water})}{(\text{p-toluic acid}) \times (\text{methanol})}$ with the terms in a parentheses representing the concentrations of the individual components per unit volume.

The higher temperatures are preferred, because, due to the weakly endothermic nature of the reaction (the reaction enthalpy amounts to +7.3 kcal/mol), the equilibrium shifts in favor of p-toluic acid methyl ester formation with increasing temperature.

In esterification with vaporous methanol, the resulting water of reaction is driven off and thus the chemical equilibrium is shifted completely in favor of p-toluic acid methyl ester formation.

The particular esterification process according to the present invention offers considerable advantages as compared with known methods. The greatest part of the conversion can be carried out in one or more serially connected, continuous, liquid reaction mixture flow-through autoclaves as a purely liquid phase reaction. This provides a higher output rate as compared with the vaporous methanol and molten or dissolved p-toluic acid reaction in a pressure column. Consequently, per unit time reactor volume, larger amounts of p-toluic acid can be esterified than would otherwise be possible for given investment. For the ending of the esterification by bringing the esterification to completion, the small remaining reaction time means that, as compared to what would otherwise be needed for carrying out the entire esterification in a pressure column, only a relatively small reactor volume is needed in the pressure column following the autoclaves. The total reactor volume resulting in the combination of autoclaves and pressure column according to the invention is smaller, for given output, than would be the case for carrying out the entire esterification in the pressure column. If only one or more autoclaves arranged in cascade were used, it would not be possible to obtain a complete conversion of the p-toluic acid, unless there were expensive removal of the water of reaction to shift the equilibrium; this is true both for batch and for continuous operation. The particular process technique according to the present invention furthermore prevents the carrying of considerable amounts of non-esterified p-toluic acid out of the column in the vaporous methanol; such would be the case with the charging of a melt of p-toluic acid due to its relatively high vapor pressure at the esterification temperatures.

Concerning the purification step of the method of the invention, this step is preferably carried out by first washing the reaction mixture, which remains after the oxidation of the p-toluic acid methyl ester and in which the monomethyl terephthalate has crystallized out by cooling, with a solvent which only fails to dissolve the monomethyl terephthalate. Then, the crystalline monomethyl terephthalate is separated from the solution and dissolved at increased temperature in a solvent exhibiting a strong temperature dependence in its dissolving of monomethyl terephthalate. Thereafter, the dissolved monomethyl terephthalate is conducted through a solid adsorbent, activated carbon, for the purpose of removing especially colored impurities. Preferably, the adsorbent is in the form of a fixed bed. Subsequently, the pure monomethyl terephthalate is separated by mechanical means, after its crystallization by cooling the solution coming from the adsorption process.

As for the solvent exhibiting a small dissolving ability for monomethyl terephthalate to be used in the washing, methanol or chloroform are examples. Their capacities for dissolving monomethyl terephthalate at low temperatures (up to 20°C) is given in Table 2.

Table 2

| | Solubility of monomethyl terephthalate. | |
|---|---|---|
| T | Solubility of monomethyl terephthalate, in grams, in | |
| °C | 100 grams methanol | 100 grams chloroform |
| 0 | 1.08 | 0.19 |
| 10 | 1.25 | 0.22 |
| 20 | 1.87 | 0.27 |

The temperature for the washing of monomethyl terephthalate lies in the case where methanol is used at the highest at 30°C, but preferably at 0°C. When using chloroform, the maximum washing temperature is 30° to 40°C, but preferably is 10°C.

The reaction mixture coming from the final oxidation step of the invention and composed essentially of monomethyl terephthalate, p-toluic acid methyl ester, and the methyl ester of terephthalaldehyde acid can be processed using two different techniques according to the invention.

Technique 1: The reaction mixture, either in crystallized form or, preferably, in the form of a suspension of crystallized monomethyl terephthalate in a melt of p-toluic acid methyl ester still containing in solution a part of the monomethyl terephthalate and also containing in solution some methyl ester of terephthalaldehyde acid, is mixed with an appropriate solvent, so that all components but monomethyl terephthalate, which remains suspended, dissolve.

Technique 2: The monomethyl terephthalate is first enriched. The reaction mixture is cooled to such a degree that as much as possible of the monomethyl terephthalate crystallizes out of a remaining molten portion composed primarily of the methyl ester of p-toluic acid. The molten and crystallized portions are separated from one another. The crystallized portion is then washed with an appropriate solvent, according to technique 1.

The suspension obtained by technique 1 or technique 2 is divided into crystalline monomethyl terephthalate and liquid using a mechanical solid/liquid separation, for example in a centrifuge. When using enrichment of the monomethyl terephthalate according to technique 2, the washing can be coupled with the mechanical separation of crystallized and molten portions, so that the suspending of the crystallized portion and a subsequent mechanical solid-liquid separation is not needed.

The solution obtained by washing is then separated by distillation into solvent on the one hand and p-toluic acid methyl ester and terephthalaldehyde acid methyl ester on the other hand. These last two are recycled back for further oxidation. An occurring residual portion of undesired by-products must be removed. The solvent can be used again for washing.

The monomethyl terephthalate obtained following the washing still contains traces of colored contaminants. These are removed by the mentioned adsorption. The monomethyl terephthalate is dissolved at increased temperature in a solvent that has a strong tempature dependence in its ability to dissolve monomethyl terephthalate. Suitable solvents are, for example, methanol, acetone, ethyl acetate, and acetoacetic ester. Preferably, methanol is used which has already been applied at other locations in the process. The solution temperature should lie preferably between 60° and 80°C, when methanol is used; significantly higher temperatures are to be avoided, because then a noticeable esterification of the monomethyl terephthalate to dimethyl terephthalate occurs. The resulting solution of the monomethyl terephthalate is then treated with the solid adsorption agent, activated carbon, for removing the colored contaminants. This is carried out advantageously in a tower filled with the solid adsorbent. The solution flows through the tower at a temperature above its saturation point for monomethyl terephthalate, in good contact with the adsorbent. With cooling of the solution after the end of the adsorption, monomethyl terephthalate precipitates in crystalline form from the solution and is separated from the liquid using mechanical means. The remaining monomethyl terephthalate, freed from clinging solvent by drying, is white and has an acid number of $311.5 \pm 1$ and an esterification number of $311.5 \pm 1$; the theroretical values are in both cases 311.4. The melting point of the monomethyl terephthalate product lies at a temperature of 220° to 221°C.

The solvent remaining after the crystallizing of the pure monomethyl terephthalate can be recycled for solution of more monomethyl terephthalate before its introduction to the adsorption. The adsorbent can, when its ability to adsorb the colored impurities has been exhausted, be regenerated by driving off the impurities using superheated steam containing preferably some oxygen.

Referring now to the sole FIGURE of the drawing, the course of the method of the invention for producing pure nonomethylterephthalate from p-xylene by continuous operation will be explained in additional detail.

The p-xylene and air or another oxygen-containing gas flow continuously into the oxidation device 1, where they react with one another. The resulting reaction mixture, which along with p-toluic acid and p-xylene contains p-toluylaldehyde, p-toluyl alcohol, and other by-products, goes into device 2, where a mechanical and/or thermal separation takes place. The separated p-xylene, p-toluyl alcohol, and p-toluylaldehyde, together with p-toluic acid which was not separated, is fed back to the oxidation device 1. The p-toluic acid fraction from device 2 proceeds into the exterifying device 3. The exhaust air coming from oxidation device 1 is separated in separating device 16 into a p-xylene fraction containing part of the reaction water and a residual air fraction. The water of reaction is to be removed from the p-xylene fraction. The p-xylene fraction is recycled back into the oxidation device 1.

In the esterifying device 3, the p-toluic acid is reacted to the methyl ester of p-toluic acid continuously with methanol. The resulting, liquid reaction mixture is fed into the separating device 4, where it undergoes a thermal separation into one fraction made up of the methylester of p-toluic acid, another fraction containing by-products to be removed from the process, and, if necessary, a third fraction composed of unreacted p-toluic acid. Unreacted p-toluic acid is recycled back into the esterifying device 3; the methyl ester of p-toluic acid moves continuously into the oxidation device 5.

With reference to separating device 18, there p-toluic acid methyl ester is separated from the methanolic exhaust vapor from the esterifying device 3. This collected ester is cycled back to the process, into separating device 4. At separating device 19, water of reaction, methanol, and any p-xylene which may be present are separated from one another; the p-xylene is cycled back to oxidation device 1 and the methanol is cycled back to the esterifying device 3; the water of reaction together with any inert gases is removed from the process.

For the oxidation of the methyl ester of p-toluic acid flowing into the oxidation device 5, air or other oxygen-containing gas is continuously introduced into the device. The reaction mixture leaving device 5 is composed primarily of unreacted methyl ester of toluic acid, monomethyl terephthalate, and terephthalaldehyde acid methyl ester; it is fed into the separating device 6 after having first been cooled to cause most of the monomethyl terephthalate to crystallize out. In device 6, the crystallized monomethyl terephthalate is mechanically separated from the remaining melt, which is composed primarily of the methyl ester of p-toluic acid along with terephalaldehyde acid methyl ester. This melt is recycled back into the oxidation device 5. The crystallized substance, which is essentially monomethyl terephthalate (MMT) plus contaminants, goes into the washing device 7. The exhaust air leaving the oxidation device 5 is separated in the separating device 17 into a p-toluic acid methyl ester fraction, which is fed back to the device 5, after the water of reaction contained in it has been separated from it and a residual air fraction.

The washing of the monomethyl terephthalate is carried out in device 7 with a solvent, for instance methanol as above-mentioned. The resulting suspension of crystalline monomethyl terephthalate in the resulting solution of methanol plus contaminants is then directed into the mechanical separating device 8, where a separation into crystalline monomethyl terephthalate in one fraction and methanol plus essentially the methyl ester of p-toluic acid and the methyl ester of terephthalaldehyde acid in another fraction is effected. The methanolic solution is processed in the thermal separating device 15; the recovered methanol is recycled back to the washing device 7, while the obtained mixture of p-toluic acid methyl ester plus the terephthalaldehyde acid methyl ester is fed back to the oxidation device 5. Any residue which may remain is removed from the process.

The crystalline monomethyl terephthalate from separating device 8 contains color contaminants; it is fed into the solution device 9, where it is dissolved in a solvent, for example methanol as described above at elevated temperature. The resulting solution of monomethyl terephthalate in methanol, now containing color contaminants, is fed into either of the adsorption devices 10a and 10b, where the colored contaminants are removed. After the adsorbent has become exhausted by the collection of a certain amount of colored contaminants, it is regenerated by passing superheated steam containing preferably some oxygen through it. The cleaned solution coming from the adsorption device 10a or 10b is cooled in the cooling device until there has been the most complete crystallization possible of the monomethyl terephthalate. The crystalline monomethyl terephthalate is separated from the liquid in the mechanical separating device 12 and then dried in the drying device 13 for the removal of clinging methanol. This gives the final monomethyl terephthalate product. The methanol gas is condensed in device 14 and recycled back with the methanol coming from device 12 into the solution device 9.

Further illustrative of the present invention are the following examples:

EXAMPLE 1

The batch oxidation of p-xylene to p-toluic acid was carried out in a vertical bubble-column reactor made of type-V4A steel. The internal diameter of the reactor was 10 centimeters. A heat exchanger was built into the reactor; heat could also be introduced or extracted using the tube wall of the reactor. The air used as the oxidizing agent was preheated to reaction temperature and flowed continuously through the reactor. It was broken up into small gas bubbles by passing it through a sieve plate mounted in the bottom of the column. The gas mixture leaving the reactor was, before its expansion to normal pressure, fed through a condenser for the purpose of condensing entrained p-xylene and resulting water of reaction. Condensed p-xylene was fed back into the reactor, while the condensed water was removed from the reaction system. To obtain a collection of residual amounts of p-xylene, the exhaust air was sent through two traps, each cooled to 0°C, and through an adsorption tower filled with activated carbon.

Into the described reactor were charged 2000 grams of p-xylene, to which 200 milligrams of cobalt in the form of p-xylene-soluble cobalt salts of $C_6$ to $C_{10}$ fatty acids had been added. The p-xylene was first warmed with a nitrogen stream to 120°C. Then, the nitrogen stream was replaced by an air stream flowing at the rate of 1,145 standard (0°C, 760 mm Hg) liters per hour. The temperature during the entire oxidation was 120° ± 1°C, with the reactor pressure lying at 8 atmospheres.

According to information gained in a corresponding preliminary experiment, that with a p-xylene conversion greater than about 32 percent under the named conditions after a reaction time of over 120 minutes significant amounts of the undesired succeeding products terephthalaldehyde acid and terephthalic acid had formed, the oxidation was stopped after 120 minutes. The reaction mixture then had the following composition:

| Component | Mols |
|---|---|
| p-xylene | 12.89 |
| p-toluyl alcohol | 0.43 |
| p-tolualdehyde | 0.92 |
| p-toluic acid | 4.43 |
| p-toluyl ester of p-toluic acid | 0.02 |
| terephthalaldehyde acid | 0.01 |
| terephthalic acid | 0.05 |
| other by-products | 0.12 |

From this can be calculated that 74 percent of the converted p-xylene reacted to p-toluic acid. When one considers that the p-toluyl alcohol and p-tolualdehyde can be cycled back into another oxidation batch for conversion into p-toluic acid, the yield calculates to 96.6 percent. The yield for the undesired succeeding products terephthalaldehyde acid and terephthalic acid amounts to a total of 1 percent.

EXAMPLE 2

The continuous oxidation of p-xylene to p-toluic acid was carried out in a vertical, tubular, bubble-column reactor having an internal diameter of 10 centimeters and made from type-V4A steel. A heat exchanger had been built into the reactor; heat could also be added or extracted through the tube wall of the reactor. The air used as oxidizing agent was conducted into the reactor in the same manner as in Example 1; the exhaust air leaving the reactor was treated likewise in the same manner in which the exhaust air was treated in Example 1. Partitions were built into the reactor at different levels throughout its height, so that the liquid, which flowed continuously from the top of the reactor downwards to be removed above the gas distributor, experienced only small mixing of volume elements at different locations along the height dimension of the reactor. This meant the realizing of a narrow retention time spectrum for the continuously flowing liquid.

Into the described reactor were charged firstly 2,000 grams of p-xylene to which had been mixed 200 milligrams of cobalt in the form of p-xylene-soluble salts of $C_6$ to $C_{10}$ fatty acids. The p-xylene was first warmed to a temperature of 140°C using a nitrogen stream. Then, the gas stream was changed to air flowing at 480 standard liters per hour. The temperature was 140° ± 2°C, the pressure 8 atmospheres, during the entire subsequent oxidation. The reaction was operated discontinuously at first, until the reaction mixture in the reactor had reached the following composition, after 60 minutes of operation:

| Component | Weight-% |
| --- | --- |
| p-xylene | 89.3 |
| p-toluyl alcohol | 2.6 |
| p-tolualdehyde | 3.9 |
| p-toluic acid | 3.5 |
| terephthalaldehyde acid + terephthalic acid | 0.1 |
| p-toluyl ester of p-toluic acid | 0.4 |
| other by products | 0.2 |

Then, the reaction mixture was continuously removed. The removed reaction mixture was cooled to 15°C and the resulting crystalline p-toluic acid and terephthalic acid was separated from the remaining liquid (Filtrate I). The crystalline material was then washed with fresh p-xylene, whose temperature was 15°C. This became Filtrate II. The joined Filtrates I and II were fed back, together with additional fresh p-xylene, into the reactor with a membrane pump quasi-continuously, i.e., with short interruptions due to the time required for the discontinuously performed separation of crystalline material and liquid. The p-xylene contained in Filtrate II and the additional fresh p-xylene added to Filtrates I and II when being pumped into the reactor equalled, on a molar basis, the sum of the removed p-toluic acid and terephthalic acid + the p-xylene clinging to the filter cake.

After the reactor had been operated for about 150 minutes and had reached a steady state operation, the following average composition figures were found for reaction mixture removed continuously from the reactor, which was carrying within itself a liquid volume of about 2,700 milliliters:

| Component | Weight-% |
| --- | --- |
| p-xylene | 78.0 |
| p-toluyl alcohol | 2.5 |
| p-tolualdehyde | 5.5 |
| p-toluic acid | 11.4 |
| p-toluyl ester of p-toluic acid | 1.2 |
| terephthalaldehyde | 0.1 |
| terephthalic acid | 0.4 |
| remaining by-products | 1 |

The liquid removed from the reactor amounted to about 3,700 grams/hour. From this, 372 grams p-toluic acid + 15 grams terephthalic acid per hour were precipitated. About 3,315 grams/hour reaction mixture, from which the p-toluic acid had been removed, were fed back into the reactor, together with an additional 300 grams/hour fresh p-xylene and small amounts of catalyst (50 milligrams cobalt per 1,000 grams p-xylene).

During the steady state operation, which was maintained for more than 360 minutes, 93 percent of the converted p-xylene reacted to p-toluic acid and 2.3 percent to terephthalic acid; the remainder was distributed among various other by-products.

EXAMPLE 3

The discontinuous oxidation of p-toluic acid methyl ester to monomethyl terephthalate was carried out in a reaction system as described in Example 1. 1,500 grams of p-toluic acid methyl ester, to which 150 milligrams of cobalt in the form of p-toluic acid methyl ester-soluble cobalt salts of $C_6$ to $C_{10}$ fatty acids had been added, were charged into the reactor and first brought to the desired reaction temperature of 200°C using a flow of heated nitrogen gas. Then, the oxidation was begun by changing the gas stream to air at a flow rate of 420 standard liters per hour. The pressure in the reactor was about 1 atmosphere. In a corresponding preliminary experiment, it had been determined that, for a p-toluic acid methyl ester conversion of more than about 35 percent, which was reached after a reaction time of about 360 minutes, larger amounts of undesired, high boiling point by-products formed and the thermal transformation of monomethyl terephthalate to dimethyl terephthalate and terephthalic acid proceeded in already detectable scale; consequently, the batch oxidation was stopped after 350 minutes. The resulting reaction mixture had the following composition:

| Component | Moles |
| --- | --- |
| p-toluic acid methyl ester | 6.44 |
| methyl ester of terephthalaldehyde acid | 0.18 |
| monomethyl terephthalate | 3.17 |
| dimethyl terephthalate | 0.01 |
| terephthalic acid | 0.01 |
| remaining by-products | 0.14 |

From these results can be calculated that 89 percent of the converted p-toluic acid methyl ester reacted to monomethyl terephthalate; when taking into consideration that the methyl ester of terephthalaldehyde acid can be charged into a subsequent oxidation batch, the effective yield for monomethyl terephthalate amounts to 94 percent.

EXAMPLE 4

Analogously to Example 3, 1,950 grams of p-toluic acid methyl ester, to which 230 milligrams of cobalt in the form of p-toluic acid methyl ester-soluble salts of $C_6$ to $C_{10}$ fatty acids had been mixed, were oxidized at 160°C and 4 atmospheres pressure with air flowing at a rate of 485 standard liters per hour. This experiment was stopped at a p-toluic acid methyl ester conversion of 27 percent after 240 minutes, because, due to the increased pressure a mentionable formation of the undesired products (see Example 3) began above this conversion, in spite of the lower temperature.

The resulting reaction mixture had the following composition:

| Component | Mols |
| --- | --- |
| methyl ester of p-toluic acid | 9.44 |
| terephthalaldehyde acid methyl ester | 0.25 |
| monomethyl terephthalate | 3.03 |
| dimethyl terephthalate | 0.04 |
| terephthalic acid | 0.04 |
| remaining by-products | 0.19 |

From this can be determined that 85 percent of the converted p-toluic acid methyl ester reacted to monomethyl terephthalate; considering that the methyl ester of terephthalaldehyde acid can be cycled into a subsequent batch for renewed oxidation, the effective yield of monomethyl terephthalate is 92.5 percent.

EXAMPLE 5

1,000 grams of a reaction mixture resulting from the air-oxidation of methyl ester of p-toluic acid were used for the combined washing and adsorption steps according to the invention. The composition of this reaction mixture was as follows:

| Component | Weight-% |
| --- | --- |
| methyl ester of p-toluic acid | 60.12 |
| methyl ester of terephthalaldehyde acid | 0.94 |
| monomethyl terephthalate | 35.36 |
| dimethyl terephthalate | 0.30 |
| terephthalic acid | 0.30 |
| p-toluic acid | 1.14 |
| remaining by-products | 1.93 |

The solidified reaction mixture was comminuted and stirred intensively with 800 grams methanol at 0°C for 1 hour. Then, the undissolved crystalline monomethyl terephthalate was filtered with suction and subsequently carefully washed with 200 grams of methanol whose temperature was 0°C. The thus-obtained monomethyl terephthalate, whose weight lay at 311 grams, had an acid number of 312 ± 1.5; using gas chromatographic analysis no foreign substances could be detected in this monomethyl terephthalate, but the product showed a weak yellow coloring.

Together with the other compounds mentioned above in the composition, 44 grams of monomethyl terephthalate remained in the methanolic solution. When chloroform is used, this fraction is reduced, for a washing temperature of 0°C, to about 3 grams.

For the purpose of removing the colored impurities by adsorption, 310 grams of the monomethyl terephthalate obtained from the just-described washing were dissolved at 63°C in 4120 grams of methanol. At this temperature, this solution was conducted at the flow rate of 1,500 milliliters per hour through an adsorption tower filled with granular activated carbon. The retention time of the solution in the adsorption tower amounted to 20 minutes. After the solution had left the tower, it was cooled to 0°C to precipitate crystalline monomethyl terephthalate. The crystalline product was filtered by suction means and dried. In this way, 257 grams of white monomethyl terephthalate was obtained. Its acid number was 311.5 ± 1. 44 grams of monomethyl terephthalate remained dissolved in the filtrate. 10 grams of monomethyl terephthalate remained in the adsorption tower or was lost during the separation operation.

The obtained monomethyl terephthalate (I) and the filtrate (A) were examined for possible presence of colored contaminants. A solution of 0.2 grams monomethyl terephthalate (I) in 20 milliliters dimethyl formamide and the obtained methanolic filtrate (A) were subjected to a beam of monochromatic light (400 nanometers). The absorption of the light was measured. The thickness of the cells holding the liquids was 40 millimeters. The comparison substance for the obtained monomethyl terephthalate (I) was a monomethyl terephthalate subjected to multiple distillation; this was washed several times with chloroform to remove dimethyl terephthalate. The comparison substance for the filtrate (A) was purest methanol. The measured percent-transmissions of the solutions, together with the corresponding values for monomethyl terephthalate which was recrystallized once in methanol after the described washing but without the adsorption, and the corresponding mother liquor (B), are presented in Table 3.

Table 3

| Sample | %-Transmission |
| --- | --- |
| Monomethyl terephthalate (I) | 98 ± 1 |
| Monomethyl terephthalate (II) | 98 ± 1 |
| Monomethyl terephthalate (III) | 89 ± 1 |
| Filtrate (A) | 100 ± 1 |
| Mother liquor (B) | 77 ± 1 |
| Purest methanol | 100 ± 1 |

The term "conversion" as used herein means the change of the indicated chemical compound to some other chemical compound. Thus, a p-xylene conversion of 20% means that 20% of a basequantity of p-xylene has changed to some other chemical compound, while 80% is still p-xylene.

The term "conversion" as used herein means the change of the indicated chemical compound to some other chemical compound. Thus, a p-xylene conversion of 20 percent means that 20 percent of a base-quantity of p-xylene has changed to some other chemical compound, while 80 percent is still p-xylene.

The following terms are used interchangeably herein and refer to the same compound: "methyl ester of p-toluic acid" and "p-toluic acid methyl ester." This compound is called "methyl p-toluate" on the above-referenced page 679 of ORGANIC CHEMISTRY by Morrison and Boyd.

Alternatively, the separating device 6 in the drawing can be avoided and the reaction mixture from the oxidation device 5 can be fed directly into the washing device 7.

Also alternatively, the reaction mixture from the oxidation device 5 can be washed right in the separating device 6. Then, there is no need for washing device 7 and separating device 8.

As used herein, the chemical compounds mean the compounds whose structural formula is given below:

p-xylene

p-toluyl alcohol

p-toluyl aldehyde

p-toluic acid

terephthalaldehyde

terephthalaldehyde acid

| | | |
|---|---|---|
| terephthalic acid | 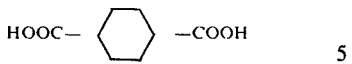 | |
| p-toluic acid p-toluyl ester | 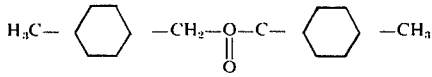 | |
| p-toluic acid methyl ester | H₃C— ⬡ —COOCH₃ | |
| methyl ester of terephthalaldehyde acid | H₃COOC— ⬡ —CHO | |
| monomethyl terephthalate | H₃COOC— ⬡ —COOH | |
| dimethyl terephthalate | H₃COOC— ⬡ —COOCH₃ | |

As used herein, the acid number of the monomethyl terephthalate is defined as the milligrams KOH necessary for neutralizing 1 gram of monomethyl terephthalate.

As used herein the esterification number of the monomethyl terephthalate is defined as the milligrams KOH necessary for saponification of 1 gram monomethyl terephthalate.

It will be understood that the above description of the present invention is susceptible to various modifications, changes and adaptations, and the same are intended to be comprehended within the meaning and range of equivalents of the appended claims.

We claim:

1. Method for producing high-purity monomethyl terephthalate suitable directly as a starting product for the production of polyester fibers, comprising the following process steps:
   a. oxidizing p-xylene to p-toluic acid by reacting said p-xylene with an oxygen containing gas in a gas-liquid contact system at a temperature between 90° and 130°C, a pressure between 3 and 15 atmospheres, in the presence of a polyvalent heavy metal salt as the oxidation catalyst, and for a time such that the conversion of said p-xylene to said p-toluic acid is between 15 and 60 percent;
   b. reacting the p-toluic acid from step (a) with methanol in a first esterification stage at a temperature between 150° and 230°C and a pressure between 15 and 60 atmospheres and then reacting the residual p-toluic acid substantially completely to p-toluic acid methyl ester by countercurrent contact with gaseous methanol at temperatures between 220° and 260°C and pressures at which said methanol is substantially in vapor form;
   c. oxidizing p-toluic acid methyl ester from step (b) with an oxygen containing gas in a gas-liquid system at a temperature between 140° and 170°C, pressures from 1 up to 6 atmospheres, in the presence of a polyvalent heavy metal salt as the oxidation catalyst, and for a time such that between 20 and 45 percent of said methyl ester is converted to monomethyl terephthalate;
   d. separating the crystalline monomethyl terephthalate reaction product from the reaction mixture following step (c);
   e. dissolving said monomethyl terephthalate in a solvent which exhibits a strong temperature dependence for the solubility of monomethyl terephthalate, and contacting the resulting solution with activated carbon to remove color impurities therefrom;
   f. cooling the thus-treated solution to recrystallize the monomethyl terephthalate therefrom; and
   g. recovering the resulting high-purity monomethyl terephthalate product.

2. A method as claimed in claim 1 wherein the catalyst in step (a) is a cobalt salt in a concentration between $10^{-5}$ and $10^{-2}$ gram atom cobalt/mole of p-xylene and the catalyst in step (c) is a cobalt salt in a concentration of $10^{-5}$ and $10^{-3}$ gram atom cobalt/mole of p-toluic acid methyl ester.

3. A method as claimed in claim 1 wherein the temperature during the first stage esterification of step (b) is between 200° and 230°C and the pressure is between 40 and 60 atmospheres.

4. A method as claimed in claim 1 wherein the oxygen containing gas is in the form of air.

* * * * *